US012314146B2

(12) United States Patent
Perks et al.

(10) Patent No.: US 12,314,146 B2
(45) Date of Patent: *May 27, 2025

(54) SYSTEMS AND METHODS FOR CONFIGURATION OF WITNESS SLEDS

(71) Applicant: Dell Products, L.P., Round Rock, TX (US)

(72) Inventors: Michael Albert Perks, Austin, TX (US); Ramesha He, Bangalore (IN); Krishnaprasad Koladi, Bengaluru (IN); Bharath Koushik Bangalore Suryanarayana, Bangalore (IN); Syama Sundar Poluri, Round Rock, TX (US); Faizal Sn, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 97 days.

This patent is subject to a terminal disclaimer.

(21) Appl. No.: 18/306,303

(22) Filed: Apr. 25, 2023

(65) Prior Publication Data

US 2024/0362131 A1 Oct. 31, 2024

(51) Int. Cl.
*G06F 11/00* (2006.01)
*G06F 11/20* (2006.01)
*G06F 11/30* (2006.01)
*G06F 13/38* (2006.01)
*G06F 13/42* (2006.01)

(52) U.S. Cl.
CPC ...... *G06F 11/2094* (2013.01); *G06F 11/3034* (2013.01); *G06F 13/385* (2013.01); *G06F 13/4221* (2013.01)

(58) Field of Classification Search
CPC .......................... G06F 11/2094; G06F 3/0689
See application file for complete search history.

(56) References Cited

U.S. PATENT DOCUMENTS

| 2007/0156781 | A1* | 7/2007 | Kapoor | G06F 16/217 |
| 2020/0319812 | A1* | 10/2020 | He | G06F 3/067 |
| 2023/0088529 | A1* | 3/2023 | Bhuleskar | G06F 3/0619 |
| | | | | 711/154 |

OTHER PUBLICATIONS

Hristov, Teodora, "Understanding the vSAN Witness Host", Aug. 2, 2021, VMWare (Year: 2021).*

* cited by examiner

*Primary Examiner* — Michael Maskulinski
(74) *Attorney, Agent, or Firm* — Fogarty LLP (57) ABSTRACT

Systems and methods provide witness sled hardware that may be installed in a chassis and that is configurable using management resources of a chassis in which the witness sled is installed. The chassis may include data storage devices and Information Handling Systems (IHSs), each including one or more CPUs (Central Processing Units) that execute instructions that cause a respective IHS to store data redundantly to the plurality of data storage devices, such as part of a vSAN (Virtual Storage Area Network). The witness sled is configured to provide witness functions, such as arbitrating discrepancies in the redundantly stored data. The chassis includes a management controller that is configured to interface with the witness sled to set up high-speed network connections supported by the witness sled in order to configure the witness sled for providing witness functions within the vSAN, while accounting for the limited resources of the compute sled.

18 Claims, 5 Drawing Sheets

SYSTEMS AND METHODS FOR CONFIGURATION OF WITNESS SLEDS

FIELD

The present disclosure relates generally to Information Handling Systems (IHSs), and relates more particularly to configuring hardware components providing witness functions in support of data storage networks implemented by IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information.

Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be deployed in a wide variety of locations and utilized in a wide variety of computational tasks. In some instances, IHSs may be servers configured to support edge computing at the physical edge of a network. Edge server IHSs may support connections between networks and/or may be provide users with entry points to a network. Located at edge locations, edge server IHSs store at least some information in physical proximity to users, thus minimizing latency and providing efficient computational capabilities without relying on remote computing, such as provided in cloud networks.

Although the hardware of IHSs used in edge computing may be specialized accordingly to the needs of specific customers and deployments, the administration and operation of these IHS edge servers may be aided through the use of virtualized computing, data storage and networking applications that operate using the physical resources of one or more edge server IHSs. Virtualized data storage applications include vSANs (Virtual Storage Area Networks) that provide virtualized storage of data using a pool (i.e., cluster) of storage drives or other storage resources, where the stored data is replicated (i.e., mirrored) in multiple different storage resources, thus providing fault tolerance and also supporting improved access to the data.

In providing fault tolerance, a vSAN application may mirror data across multiple different storage resources that may be in a single IHS, or that may be disbursed across multiple IHSs, such within rack mounted server IHSs. Such vSAN applications provide relative ease of administration and fault tolerance, thus supporting high availability in critical applications, such as in health care, finance, public utilities, networking, etc. However, by mirroring data, inconsistencies may arise between the different versions of the data stored that has been redundantly in the different storage resources.

SUMMARY

In various embodiments, chassis may include a plurality of data storage devices; one or more Information Handling Systems (IHSs), each comprising one or more CPUs (Central Processing Units) and further comprising one or more memory devices having instructions stored thereon that, upon execution by a CPU, respectively cause each IHS to store data redundantly to the plurality of data storage devices; and a witness sled comprising a logic unit and a memory device having instructions stored thereon that, upon execution by the logic unit, cause the witness sled to arbitrate discrepancies in the data redundantly stored in the plurality of storage devices.

In some embodiments, the IHSs store data redundantly to the plurality of data storage devices according to instructions of a vSAN application. In some embodiments, the witness sled is replaceable component of the chassis that is removeable by an administrator without opening an enclosure of the chassis. In some embodiments, the one or more IHSs comprise replaceable compute sleds that are removeable by the administrator without opening the enclosure of the chassis. In some embodiments, the vSAN application reports changes to the redundantly stored data to the witness sled. In some embodiments, the vSAN application issues requests to the witness sled for arbitration of discrepancies in the redundantly stored data. In some embodiments, the changes to the redundantly stored data are reported by the vSAN application to the witness sled via a high-speed network connection supported by the witness sled. In some embodiments, the chassis may further include a chassis management controller comprising a logic unit and a memory device having instructions stored thereon, wherein execution of the instructions causes the logic unit to interface with the witness sled to obtain information for configuring the high-speed network connection supported by the witness sled. In some embodiments, the witness sled comprises a witness controller that is programmed to interface with the chassis management controller to transmit the information for configuring the high-speed network connection supported by the witness sled. In some embodiments, the witness controller is programmed via firmware instructions provided by the chassis management controller. In some embodiments, the witness controller and chassis management controller interface via a serial port connection. In some embodiments, the witness sled appends an error detection code to the configuration information transmitted via the serial port connection to the chassis management controller. In some embodiments, the CPUs of the IHSs comprise high-power processors and wherein the logic unit of the witness sled comprises a low-power processor. In some embodiments, the information for configuring the high-speed network connection supported by the witness sled is transmitted by the chassis management controller to a remote access controller of a respective IHS for use in configuring the witness sled to receive data for use in arbitrating discrepancies in the data redundantly stored in the plurality of storage devices.

BRIEF DESCRIPTION OF THE DRAWINGS

The present invention(s) is/are illustrated by way of example and is/are not limited by the accompanying figures.

Elements in the figures are illustrated for simplicity and clarity, and have not necessarily been drawn to scale.

DETAILED DESCRIPTION

Figure 1A:
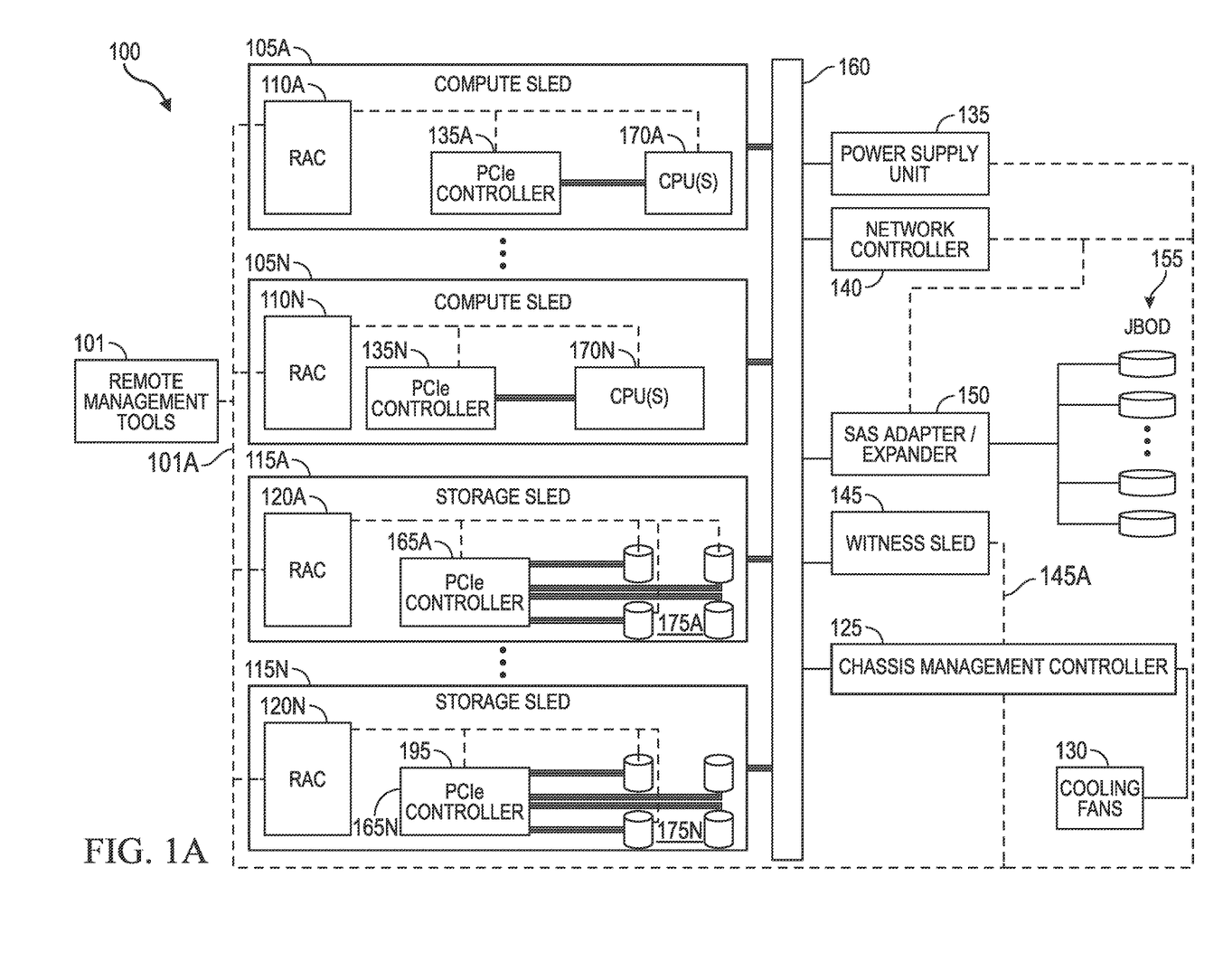
FIG. 1A is a diagram illustrating certain components of a chassis configured, according to some embodiments, to include a witness sled supporting redundant data storage using storage resources of the chassis.

FIG. 1A is a block diagram illustrating certain components of a chassis 100 that includes a witness sled 145 that supports redundant data storage using storage resources of the chassis 100. As described in additional detail below, embodiments may implement redundant data storage capabilities using chassis 100 resources such as removeable compute sled IHSs 105a-n and storage sled IHSs 115a-n. Embodiments further support configuration of a witness sled 145 for supporting redundant data storage using chassis 100 resources.

Embodiments of chassis 100 may include a wide variety of hardware configurations in which one or more IHS 105a-n, 115a-n are installed in chassis 100. Such variations in hardware configurations may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removeable IHSs 105a-n, 115a-n that are installed in the chassis. In addition, once the chassis 100 has been deployed, firmware and other software used by individual hardware components of the IHSs 105a-n, 115a-n, or by other hardware components of chassis 100, may be modified in order to update the operations that are supported by these hardware components. In some instances, such updates may be used to enable and disable features of an IHS and/or chassis that have been licensed for use by an owner or operator of the chassis 100, where the features that have been enabled and conditions for use of the enabled features may be set forth in a service agreement that is associated with the chassis 100.

Chassis 100 may include one or more bays that each receive an individual sled (that may be additionally or alternatively referred to as a tray, blade, and/or node) IHSs, such as compute sleds 105a-n, storage sleds 115a-n and one or more witness sleds 145. Chassis 100 may support a variety of different numbers (e.g., 4, 8, 16, 32), sizes (e.g., single-width, double-width) and physical configurations of bays. Embodiments may include additional types of sleds that provide various storage, power, networking and/or processing capabilities. For instance, sleds installable in chassis 100 may be dedicated to providing power management or network switch functions. Sleds may be individually installed and removed from the chassis 100, thus allowing the computing and storage capabilities of a chassis to be reconfigured by swapping the sleds with different types of sleds, in some cases at runtime without disrupting the ongoing operations of the other sleds installed in the chassis 100.

Multiple chassis 100 may be housed within a rack. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational workloads, such as computations used in machine learning and other artificial intelligence systems, may utilize computational and/or storage resources that are shared within an IHS, within an individual chassis 100 and/or within a set of IHSs that may be spread across multiple chassis of a data center.

For instance, pooled storage resources of chassis 100, such as pools of shared storage drives, may be used to implement a vSAN. In particular, pooled storage drives of chassis 100 may be logically organized into disk groups, where each disk group may be utilized through the vSAN as a single logical storage drive. As described in additional detail below, vSAN applications may utilize redundant data storage that mirrors data in multiple different storage drives, thus providing fault tolerance. As described in additional detail below, embodiments support the redundant data storage offered by a vSAN through the operation of a witness sled 145 installed in chassis 100.

Implementing computing systems that span multiple storage resources of chassis 100, such as a vSAN may utilize high-speed data links between these storage resources and processing components of the chassis, such as PCIe connections that may form one or more distinct PCIe switch fabrics that are implemented by PCIe controllers 135a-n, 165a-n installed in the IHSs 105a-n, 115a-n of the chassis. These high-speed data links may be used to support applications, such as vSANs, that span multiple processing, networking and storage components of an IHS and/or chassis 100.

Chassis 100 may be installed within a rack structure that provides at least a portion of the cooling utilized by the IHSs 105a-n, 115a-n installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n and witness sleds 145 to backplane 160 include PCIe couplings that support high-speed data links with the sleds 105a-n, 115a-n, 145. In various embodiments, backplane 160 may support various types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, network controller 140, chassis management controller 125 and/or power supply unit 135.

Figure 2:
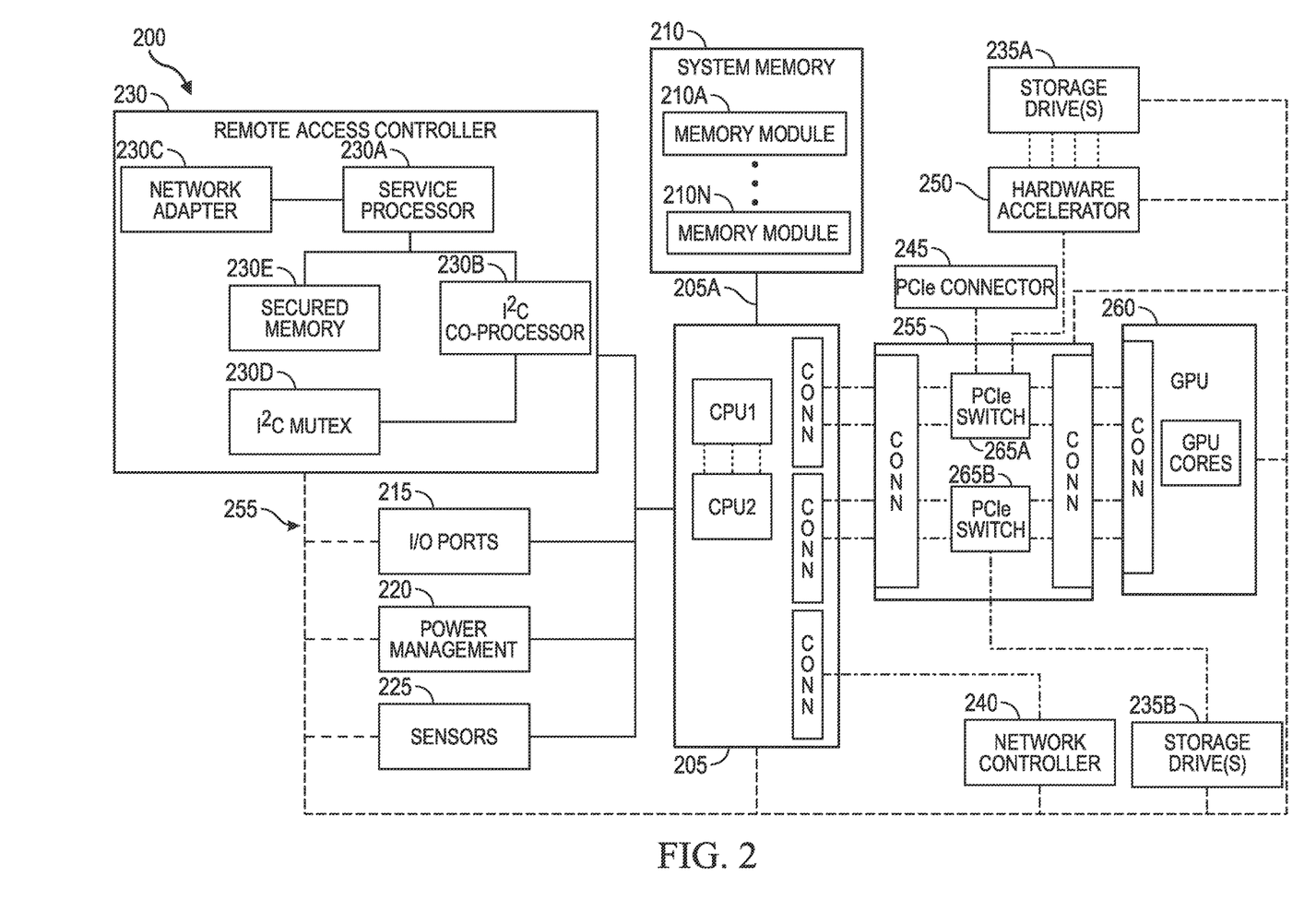
FIG. 2 is a diagram illustrating certain components of an IHS configured, according to some embodiments, for supporting redundant data storage using a witness sled.

In certain embodiments, each individual compute/storage sled 105a-n, 115a-n may be an IHS such as described with regard to IHS 200 of FIG. 2. Sleds 105a-n, 115a-n may individually or collectively provide computational processing resources that may be used to support a variety of e-commerce, multimedia, business and scientific computing workloads, including machine learning and other artificial intelligence systems. Sleds 105a-n, 115a-n are regularly configured with hardware and software that provide leading-edge computational capabilities. Accordingly, services that are provided using such computing capabilities that are provided as high-availability systems that operate with minimum downtime, such as in the described edge computing environments.

As illustrated, each compute sled 105a-n and storage sled 115a-n includes a respective remote access controller (RAC) 110a-n, 120a-n. As described in additional detail with regard to FIG. 2, remote access controller 110a-n, 120a-n provides capabilities for remote monitoring and management of a respective compute sled 105a-n or storage sled 115a-n. In support of these monitoring and management functions, remote access controllers 110a-n may utilize both in-band and side-band (i.e., out-of-band) communications with various managed components of a respective compute sled 105a-n or storage sled 115a-n. Remote access controllers 110a-n, 120a-n may collect various types of sensor data, such as collecting temperature sensor readings that are used in support of airflow cooling of the chassis 100 and the sleds 105a-n, 115a-n. In addition, each remote access controller 110a-n, 120a-n may implement various monitoring and administrative functions related to a respective sleds 105a-n, 115a-n, where these functions may be implemented using sideband bus connections with various internal components of the chassis 100 and of the respective sleds 105a-n, 115a-n.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates to the software and hardware operating in the chassis 100. For example, remote management interface 101 may provide capabilities by which an administrator can initiate updates to the firmware utilized by hardware components installed in a chassis 100, such as for storage drives 175a-n. In some instances, remote management interface 101 may include an inventory of the hardware, software and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe controller 135a-n that facilitates high speed access to computing resources described in additional detail with regard to FIG. 2, such as hardware accelerators, DPUs, GPUs, Smart NICs and FPGAs. These computing resources may be programmed and adapted for specific computing workloads, such as to support machine learning or other artificial intelligence systems. In some embodiments, the computing resources of compute sleds 105a-n may be used to implement a vSAN that provides operation of multiple storage resources as a single, logical storage drive. Such vSANs may utilize a witness sled 145 of chassis 100 in supporting redundant data storage that mirrors data across multiple different storage resources, and in particular in the identification of discrepancies that may arise between the data that is mirrored by the vSAN.

Whereas remote management tools 101 may be utilized to configure various aspects of a vSAN application, such as via capabilities provided by remote access controllers 110a-n, 120a-n, such remote management tools 101 may be unable to access a witness sled 145, especially to configure the witness sled for operation within a vSAN, or to configure the witness sled for a specific mode of operations. In some embodiments, a witness sled 145 may be implemented using low cost (i.e., low power, limited memory, limited processing power, etc.) computing capabilities that may be insufficient to effectively support robust remote management capabilities such as those supported by a remote access controller 110a-n, 120a-n. For instance, the limited resources of a witness sled 145 preclude the use of robust management tools (e.g., such as provided using protocols such as Redfish) by which remote management tools 101 could directly interface with the witness sled 145. Additionally, since the witness sled 145 is not connected directly to remote access controller 110a-n, 120a-n, no sideband management connectivity with a remote access controller is available that could be used to support configuration of a device of limited resources, such as the witness sled 145. Accordingly, as described in additional detail below, embodiments support capabilities for configuring a witness sled 145 for operation in a storage network.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple storage drives 175a-n, where the individual storage drives 175a-n may be accessed through a PCIe controller 165a-n of the respective storage sled 115a-n. In some embodiments, these storage drives 175a-n may be pooled as part of a vSAN that provides redundant data storage, such that a failure, replacement or unavailability of any of the pooled storage drives does not render data lost or unavailable. As described below, such vSANs may utilize a witness sled 145 of chassis 100 in supporting the redundant storage across multiple of the storage drives 175*a-n*. In implementing vSANs, some or all of the storage drives 175*a-n* may be logically grouped into disk groups, where each group may be utilized as a single, logical storage drive. Some disk groups may be hybrid disk groups that include both solid-state drives (SDDs) and magnetic hard-disk drives (HDDs). In a vSAN configuration, multiple such disk groups available within a cluster of IHSs may be collectively utilized to provide a storage solution supporting large storage capacities, high availability and data redundancy.

In addition to the data storage capabilities provided by storage sleds 115*a-n*, chassis 100 may provide access to other vSAN storage resources that may be installed as components of chassis 100 and/or may be installed elsewhere within a datacenter that houses the chassis 100. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that, in some instances, may be configured and managed to support data redundancy using the various drives 155.

As illustrated, the chassis 100 of FIG. 1 includes a network switch 140, such as a PCIe switch, that provides network access to the sleds 105*a-n*, 115*a-n*, 145 installed within the chassis. In some instances, network switch 140 may be an integrated component of a backplane 160 or other circuit board of chassis 100. In some instances, network switch 140 may be a replaceable component of chassis 100, such as replaceable sled that is received in a bay of the chassis 100. Network switch 140 may provide components of chassis 100 with access to external networks, either directly or indirectly via additional networking components. In some embodiments, network switch 140 may also support networking within the components of chassis 100, such as via a PCIe switch fabric that provides communications between each of the sleds 105*a-n*, 115*a-n*, 145 that are coupled to the chassis 100, and that may be used in the operation of a storage network, such as a vSAN, using the resources of chassis 100.

Chassis 100 may also include a power supply unit 135 that provides the components of the chassis with various levels of DC power. In certain embodiments, power supply unit 135 may be implemented as a replaceable sled and multiple such sleds may be used to provide chassis 100 with redundant, hot-swappable power supply units. Chassis 100 may also include various I/O controllers that may support various I/O ports, such as USB ports that may be used to support keyboard and mouse inputs and/or video display capabilities. Such I/O controllers may be utilized by a chassis management controller 125 to support various KVM (Keyboard, Video and Mouse) capabilities that provide administrators with the ability to operate the IHSs installed in chassis 100.

In addition to providing support for KVM capabilities for administering chassis 100, chassis management controller 125 may support various additional functions for sharing the infrastructure resources of chassis 100. In some scenarios, chassis management controller 125 may implement tools for managing the power 135, bandwidth available through network switch 140 and airflow cooling 130 that are available via the chassis 100. As described, the airflow cooling 130 utilized by chassis 100 may include an airflow cooling system that is provided by a rack in which the chassis 100 may be installed and managed by a cooling module of the chassis management controller 125.

As described in additional detail below, chassis management controller 125 may include a microcontroller or other logic unit that implements various management operations with respect to integrated and replaceable components of chassis 100, including operations for management of sleds 105*a-n*, 115*a-n*, 145. For instance, in embodiments, chassis management controller 125 may implement operations for configuration of a witness sled 145 for use in a storage network, such as in arbitrating data discrepancies that arise during the operation of a vSAN. In some embodiments, chassis management controller 125 may implement operations for retrieving information for configuring witness sled 145 for operation in a vSAN, such as for use in setting up a high-speed network connection with a witness sled that has limited computing capabilities.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

Figure 1B:
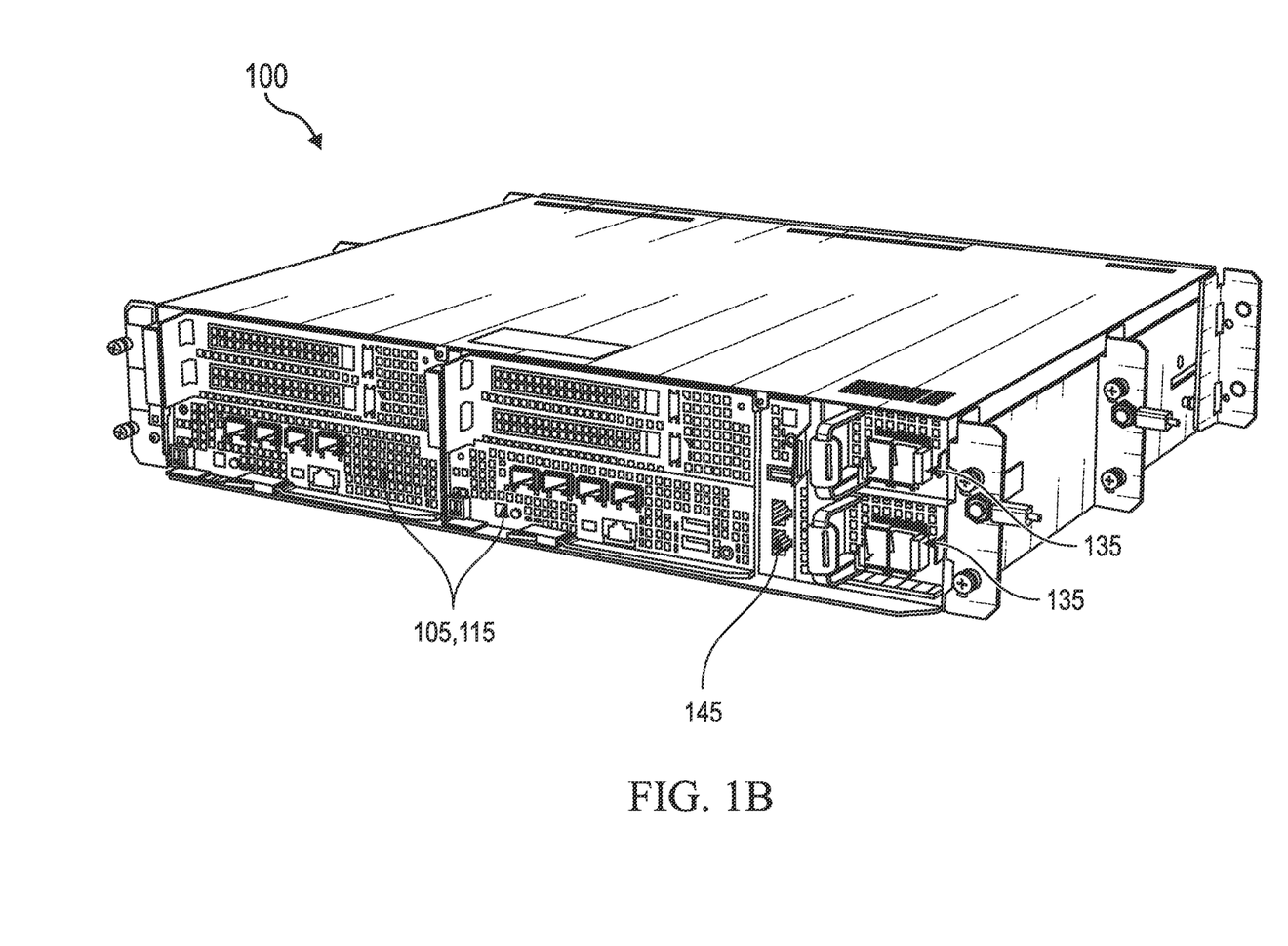
FIG. 1B is a front-facing illustration of a chassis configured, according to some embodiments, to include a witness sled supporting redundant data storage using storage resources of the chassis.

FIG. 1B is a front-facing illustration of a chassis 100 configured, according to some embodiments, to include a witness sled 145 supporting redundant data storage using storage resources of the chassis. As described with regard to FIG. 1A, storage resources of a chassis 100 may be utilized to provide redundant data storage, such as in a vSAN application that mirrors data in two or more different storage devices. In support of such capabilities, a witness function may be utilized to arbitrate discrepancies between the different versions of mirrored data.

As described, in implementing redundant data storage capabilities such as a vSAN, chassis 100 may include one or more replaceable compute or storage sleds 105, 115, 145 that are received in bays of the chassis. Once inserted into these bays, an administrator may push some sleds 105, 115, 145 within a bay until they are received by connectors that are located within the bays, such as connectors that are mounted on a backplane and that correspond to connectors that are located on the sled. Rather than being connected directly to fixed connectors of chassis 100, some sleds 105, 115, 145 may be connected to chassis 100 through an administrator manually connecting these sleds to wires or cables provided by the chassis 100, in which case the administrator may manually remove the enclosure of chassis 100 in order to access these wires or cables.

In the embodiment illustrated in FIG. 1B, chassis 100 is 2 RU (Rack Units) in height and compute and storage sleds 105, 115 are horizontally installed sleds that are 1 RU in height. In support of redundant data storage by compute and storage sleds 105, 115, witness sled 145 is a vertically installed component that spans the 2 RU height of the chassis. Also illustrated are two replaceable power supply units 135, each of which is a sled that is 1 RU in height, and each of which may be separately removed from the chassis 100. Embodiments may include a wide variety of sizes of chassis 100 and of the sizes and arrangements of sleds 105, 115, 145, 135 within the compartments of the chassis. An administrator may replace each of the sleds 105, 115, 145, 135 from time to time. In some instances, the operations of the remaining sleds may continue while a sled is being replaced, thus supporting high availability of computing functions supported by chassis 100. Accordingly, such chassis 100 may be ideally suited for use as edge servers deployed at edge locations used in support of critical computing systems.

FIG. 2 illustrates an example embodiment of an IHS 200 that may be used to implement redundant data storage operations and that is configured to support such data storage operations while configurating and utilizing witness sleds such as described herein. It should be appreciated that although the embodiments described herein may describe an IHS that is a compute sled or similar computing component that may be deployed within the bays of a chassis, a variety of other types of IHSs may also operate according to embodiments described herein. In the illustrative embodiment of FIG. 2, IHS 200 may be a computing component, such as compute or storage sled 105$a$-$n$, 115$a$-$n$ or other type of server, such as an 1 RU server installed within a 2 RU chassis, that is configured to share infrastructure resources provided within a chassis 100.

IHS 200 may utilize one or more system processors 205, that may be referred to as CPUs (Central Processing Units). In some embodiments, CPUs 205 may each include a plurality of high-power processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205$a$. The system memory 210 is coupled to CPUs 205 via one or more memory buses 205$a$ that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210$a$-$n$. Each of the removable memory modules 210$a$-$n$ may correspond to a printed circuit board memory socket that receives a removable memory module 210$a$-$n$, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line busses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or other component that is coupled to a connector (e.g., PCIe connector of a motherboard, backplane, midplane, etc.) of IHS

200. In some embodiments, network controller 240 may support high-bandwidth network operations by the IHS 200 through a PCIe interface that is supported by the chipset of CPUs 205.

As indicated in FIG. 2, in some embodiments, CPUs 205 may be coupled to a PCIe card 255 that includes two PCIe switches 265*a*-*b* that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265*a*-*b*, different embodiments may operate using different numbers of CPUs and PCIe switches. In addition to serving as I/O controllers that route PCIe traffic, PCIe switches 265*a*-*b* include switching logic that can be used to expand the number of PCIe connections that are supported by CPUs 205. PCIe switches 265*a*-*b* may multiply the number of PCIe lanes available to CPUs 205, thus allowing more PCIe devices to be connected to CPUs 205, and for the available PCIe bandwidth to be allocated with greater granularity.

As indicated in FIG. 2, IHS 200 may support storage drives 235*a*-*b* in various topologies, in the same manner as described with regard to the use of the various storage resources described with regard to the chassis 100 of FIG. 1. In the illustrated embodiment, storage drives 235*a* are accessed via a hardware accelerator 250, while storage drives 235*b* are accessed directly via PCIe switch 265*b*. In some embodiments, the hardware accelerator 250 and storage drives 235*a* may be components of a separate sled, such as a storage sled 115*a*-*n*. In some embodiments, the storage drives 235*a*-*b* of IHS 200 may include a combination of both SSD and magnetic disk storage drives. In other embodiments, all of the storage drives 235*a*-*b* of IHS 200 may be identical, or nearly identical.

As described, the storage drives 235*a*-*b* that are accessible via IHS 200 may be pooled and used to provide redundant storage, such as provided by a vSAN application supported by the chassis 100 in which the IHS 200 is installed. During the operation of a vSAN, discrepancies may arise between versions of mirrored data that has been redundantly stored. Accordingly, IHS 200 may be configured to interface with a witness sled 145 installed chassis 100 for use in arbitrating these discrepancies. As described in additional detail below, IHS 200 embodiments may also rely on a chassis management controller 125 of chassis 100 for configuration of witness sled 145 for operation as an arbitrator in a vSAN this is operated by the IHS 100. Through such capabilities, an IHS 100 may determine information for use in configuring witness sled 145, such as network address information for use in configuring a high-speed network connection with the witness sled 145, computing and other resource capabilities of the witness sled 145, witness arbitration APIs supported by the witness sled, etc.

As illustrated, PCIe switch 265*a* is coupled via a PCIe link to a hardware accelerator 250, such as a DPU, Smart-NIC, GPU and/or FPGA, that may be a connected to the IHS via a removeable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, that may be used to implement functions used to support devices coupled to the IHS 200.

As illustrated in FIG. 2, PCIe switches 265*a*-*b* may also support PCIe couplings with one or more GPUs (Graphics Processing Units) 260. Embodiments may include one or more GPU cards, where each GPU card is coupled to one or more of the PCIe switches 265*a*-*b*, and where each GPU card may include one or more GPUs 260. In some embodiments, PCIe switches 265*a*-*b* may transfer instructions and data for generating video images by the GPUs 260 to and from CPUs 205. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200. In some workloads, GPUs may be utilized as programmable computing resources for offloading other functions from CPUs 205, in the same manner as hardware accelerator 250.

As illustrated in FIG. 2, PCIe switches 265*a*-*b* may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to the IHS. Through couplings to PCIe connectors 245*a*, a variety of data storage devices, graphics processors and network interface cards may be coupled to IHS 200, thus supporting a wide variety of topologies of devices that may be coupled to the IHS 200 and that may be used in supporting redundant data storage systems.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for validation proofing the hardware and software used to provision IHS 200, may operate using validated instructions, and thus within the root of trust of IHS 200.

In some embodiments, remote access controller 230 may include a service processor 230*a*, or specialized microcontroller, that operates management software that supports remote monitoring and administration of IHS 200. The management operations supported by remote access controller 230 may be remotely initiated, updated and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 255 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 255. In some instances, the sideband management connections supported by remote access controller 230 may include PLDM (Platform Level Data Model) management communications with the managed devices 205, 235a-b, 240, 250, 255, 260 of IHS 200. In some embodiments, the remote access controller 230 may additionally or alternatively use MCTP messaging to transmit Vendor Defined Messages (VDMs) via the in-line PCIe switch fabric supported by PCIe switches 265a-b. For instance, remote access controller 230 may transmit firmware to managed devices utilizing inband signaling, such as VDMs that are transmitted using MCTP over the PCIe switch fabric that is implemented by PCIe switch 255, and/or utilizing sideband signaling, such as PLDM communications transmitted via sideband connections 255 supported by an I2C co-processor 230b of the remote access controller 230.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 255 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 255. For instance, messages utilized in device and/or system management may be transmitted using I2C sideband bus 255 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or directly, via in-line buses that are separate from the I2C sideband bus 255 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The sideband I2C bus 255 is illustrated as single line in FIG. 2. However, sideband bus 255 may be comprises of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
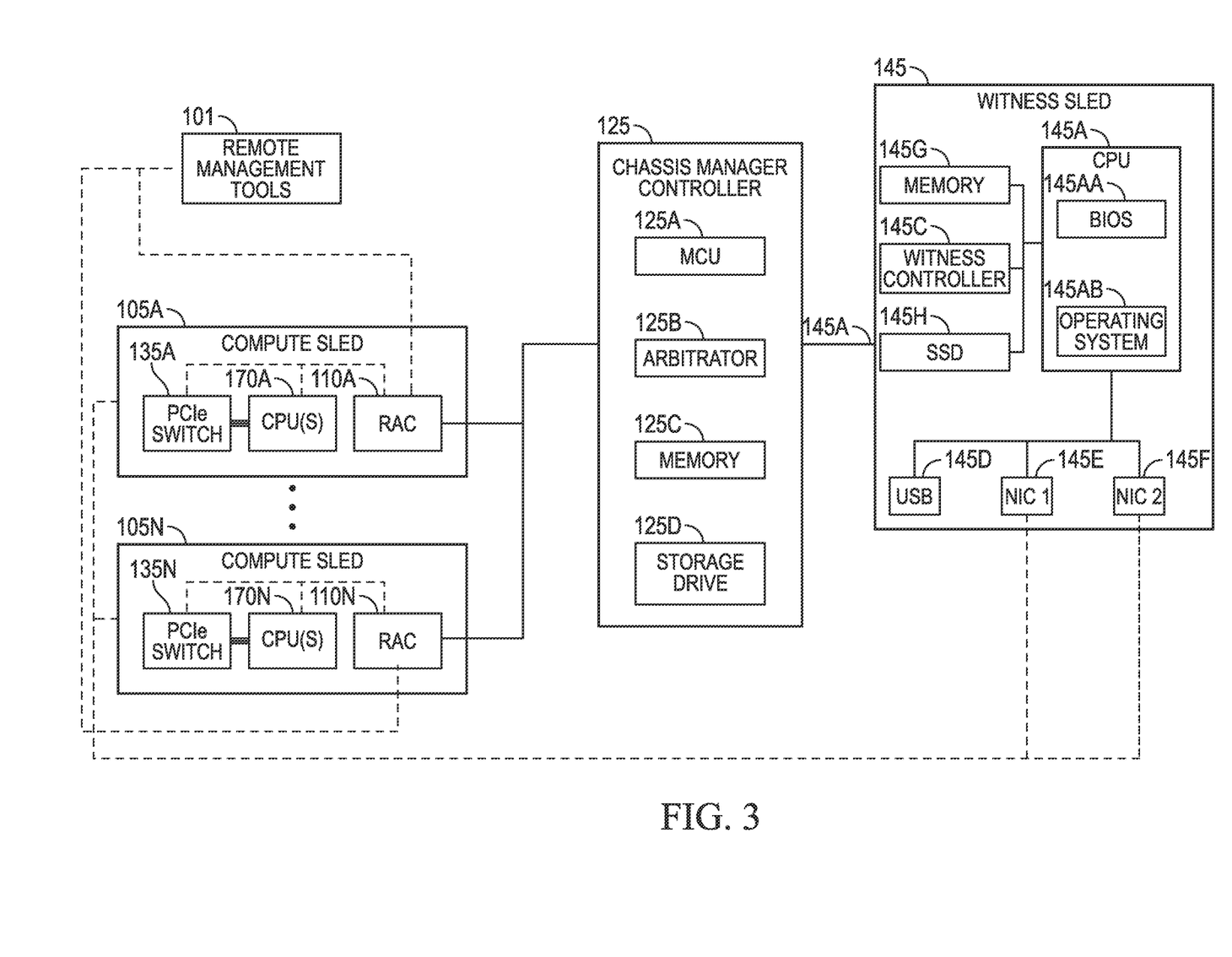
FIG. 3 is a diagram illustrating certain components of a system, according to some embodiments, supporting redundant data storage using a witness sled.

FIG. 3 is a diagram illustrating certain components of a system, according to some embodiments, supporting redundant data storage using a witness sled 145 and supporting configuration of the witness sled 145 as an arbiter of discrepancies in the redundant data storage system. As described with regard to FIGS. 1A and 1B, one or more compute sleds 105a-n may be installed as components of a chassis 100, such as a chassis that is deployed at an edge location that requires high-availability of services supported by compute sleds 105a-n. In some instances, the compute sleds 105a-n may be used to implement a vSAN that uses storage resources of chassis 100, and may also use nearby storage resources.

For instance, compute sleds 105a-n may each include high-power CPUs 170a-n that may be used in support of a redundant storage network, such as provided via a vSAN application. Each compute sled 105a-n may utilize high-speed connections implemented by PCIe switches 135a-n in interfacing with a pooled collection of storage drives that are installed in, or accessible by, chassis 100. As described, in supporting high-availability and fail-safe data integrity in a vSAN application, stored data may be mirrored in two or more different storage devices, thus providing a usable version of the data at all times, barring multiple simultaneous failures. However, when failures occur within the pooled collection of storage devices, discrepancies may arise as to the correct state of stored data. Such discrepancies may also arise due to maintenance operations within the pooled storage devices. Discrepancies may also arise due various other errors or conditions. As described, a witness function implemented by witness sled 145 may be used to resolve such discrepancies by establishing the correct state of stored data.

As indicated in FIG. 3, witness sled 145 embodiments may include a CPU 145a that is used to operate a BIOS 145aa and an operating system 145ab. In some embodiments, the CPU 145a of a witness sled 145 is a low-power processor that has significantly more limited processing capabilities when compared to CPUs 205 included in compute sled IHSs 105a that are utilized in the chassis 100 and that are used to implement the vSAN application. The limited processing capabilities of the witness sled 145 may be selected in view of the limited functions that are implemented using the CPU 145a of the witness sled. As opposed to the general-purpose CPUs 205 of a compute sled 105a-n, the processing capabilities of a witness sled 145 are utilized exclusively to fulfill the arbitration functions implemented by the witness sled 145, such that use of the low-power processor avoids unnecessary costs and energy use by the witness sled. As such, a low-power CPU 145*a* may be designed and adapted to implement witness functions while using minimal resources.

Using the computing capabilities of the low-power CPU 145*a*, the witness sled 145 may operate a BIOS 145*aa* that supports operation of the integrated hardware components of the witness sled. For instance, upon initialization of witness sled 145, BIOS 145*aa* may enumerate detected hardware components of the witness sled and may identify drivers or other interfaces for use in operating these hardware components. As illustrated in FIG. 3, the capabilities of the low-power CPU 145*a* may also be used to support an operating system 145*ab*. As with the low-power CPU 145*a*, the operating system 145*ab* of the witness node may be significantly more limited than operating systems used by compute sleds 105*a-n*. In some embodiments, operating system 145*ab* may be a limited-purpose operating environment that is specifically designed to support witness arbitration functions and related witness operations.

As illustrated in FIG. 3, the hardware capabilities of witness sled 145 may include a two NICs (Network Interface Controllers) 145*e-f* that may be used in the implementation of witness functions. For instance, NICs 145*e-f* may couple the witness sled 145 to a network utilized to support a vSAN or other storage application supporting redundant data storage, such as the described PCIe switch fabric that may connect compute sleds 105*a-n* and storage resources used in the vSAN. As storage and editing operations are conducted within the vSAN, these data transactions are reported via the switch fabric to the witness sled 145, such as via NICs 145*e-f*. As indicated in FIG. 3, the I/O capabilities of witness sled 145 may include a USB port 145*d* that may be used to couple a variety of systems to the witness sled. For instance, USB port 145*d* may be used to couple diagnostic and/or administrative tools to the witness sled 145.

Also illustrated in FIG. 3 are memory and data storage resources used by the witness sled 145. In some embodiments, witness sled 145 may include a memory 145*g* device that provides non-persistent data storage that may be used in support of witness functions, such as in buffering incoming reports of data transactions. Witness sled 145 may also include an SSD 145*h* or other persistent storage device for use in storing witness data. As described, transactions that result in changes to redundantly stored data of a vSAN may be reported to the witness sled 145. Embodiments may utilize a variety of different reporting procedures, that may be represented within one or more witness function APIs supported by operating system 145*ab*. In some instances, the reported transactions may include transaction metadata that identifies the time of the transaction and the storage drive of the vSAN in which the transaction occurred. In some instances, the reported transactions may include a digital signature or other information usable in confirming the integrity of the operative version of redundantly stored data. Based on reported transactions received by the witness sled 145, witness functions of the operating system 145*ab* may store transaction data to the SSD 145*h*.

Using this stored transaction data, witness sled 145 may be used to arbitrate discrepancies that arise in redundant data storage systems, such as vSANs or RAID configurations that mirror stored data in two or more distinct storage devices. For example, discrepancies may arise due to a failure or error in one of the vSAN storage drives or elsewhere in the vSAN. Discrepancies may also arise in response to administration or replacement of one of the vSAN storage drives. For instance, discrepancies may arise where mirrored data is modified while a storage drive providing redundant storage of the data is restarted such that the restarted storage drive does not reflect the modification. In these and other scenarios, the drives supporting redundant storage may disagree on the correct state of stored data. In order to resolve such discrepancies in redundantly stored data, the operating system 145*ab* of witness sled 145 may support APIs that support queries from a vSAN application, where such queries may request the last known state of stored data that is recorded by the witness sled. In response to such queries, the witness sled 145 consults the state information stored in SSD 145*h* in order to determine which of the storage drives stores the correct version of the data. In this manner, witness sled 145 may be utilized to resolve "split brain scenarios" in which different version of data are present and there is no immediate ability to determine which version of the data is correct.

As indicated in FIG. 3, witness sled 145 may also include a witness controller 145*c* that may be a microcontroller that is distinct from the CPU 145*a* of the witness sled, but may be mounted on the same circuit board as CPU 145*a*. In some embodiments, witness controller 145*c* may operate using firmware instructions that configure witness sled 145 for operation as an arbiter within in an application providing redundant data storage, such as a vSAN. In some embodiments, the witness controller 145*c* may interface with the chassis management controller 125 in order to configure the witness sled. Various different configurations of witness controller 145*c* may be used in order for a witness sled 145 to perform different supported arbitration functions for a vSAN network, including both initial and ongoing configuration of the witness sled 145. In some embodiments, some configuration of the witness controller 145*c* may be conducted by an MCU (Micro Controller Unit) 125*a* of the chassis management controller 125. The MCU 125*a* may load instructions from a persistent storage drive 125*d* of the chassis management controller 125 and once these instructions are loaded may utilize a volatile memory 125*c* in support of the operations of chassis management controller 125 described herein.

In this manner, the MCU 125*a* may be reprogrammed to configure certain aspects of the operation of the witness sled 145, in particular operations by witness controller 145*c* in configuring the witness sled 145 for operation in a storage network. As described, witness sled 145 utilizes a low-power CPU 145*a* that has sufficient computing capabilities for conducting witness functions, such as recording reports of transactions involving redundantly stored data and serving as arbiter of the correct state of this redundantly stored data. These limited processing capabilities are sufficient for these witness functions but provide limited capabilities for administering the witness sled 145, such as in configuring and updating the witness sled 145 for operation as an arbiter within a particular vSAN system.

For instance, configuring a witness sled 145 for use as an arbiter within a vSAN system requires determining an IP (Internet Protocol) or other network address by which to address network traffic to the witness sled 145. However, obtaining the network address of the witness sled 145 is complicated due to the limited capabilities of the witness sled 145. As described above, IHSs such as compute sleds 105*a-n* may include a remote access controller 110*a-n* that supports remote management of the IHS. As indicated in FIG. 3, each remote access controller 110*a-n* may interface with remote management tools 101 that provide administrators with capabilities for administering various aspects of the compute sled 105a-n. A wide variety of configuration information may be obtained and utilized by the remote access controllers 110a-n in managing a respective compute sled 105a-n. By contrast, witness sled 145 does not include a remote access controller and does not include any mechanism for directly interfacing with a remote access controller 110a-n in any of the compute sleds 105a-n, or that may operate elsewhere in the chassis 100. Even if a connection with a remote access controller can be established, the limited processing capabilities of the witness sled 145 precludes use of the robust remote administrative capabilities that may be available via the remote access controllers. Accordingly, embodiments provide capabilities for configuring a witness sled 145 in a manner that accounts for the limited processing capabilities of the witness sled.

Figure 4:
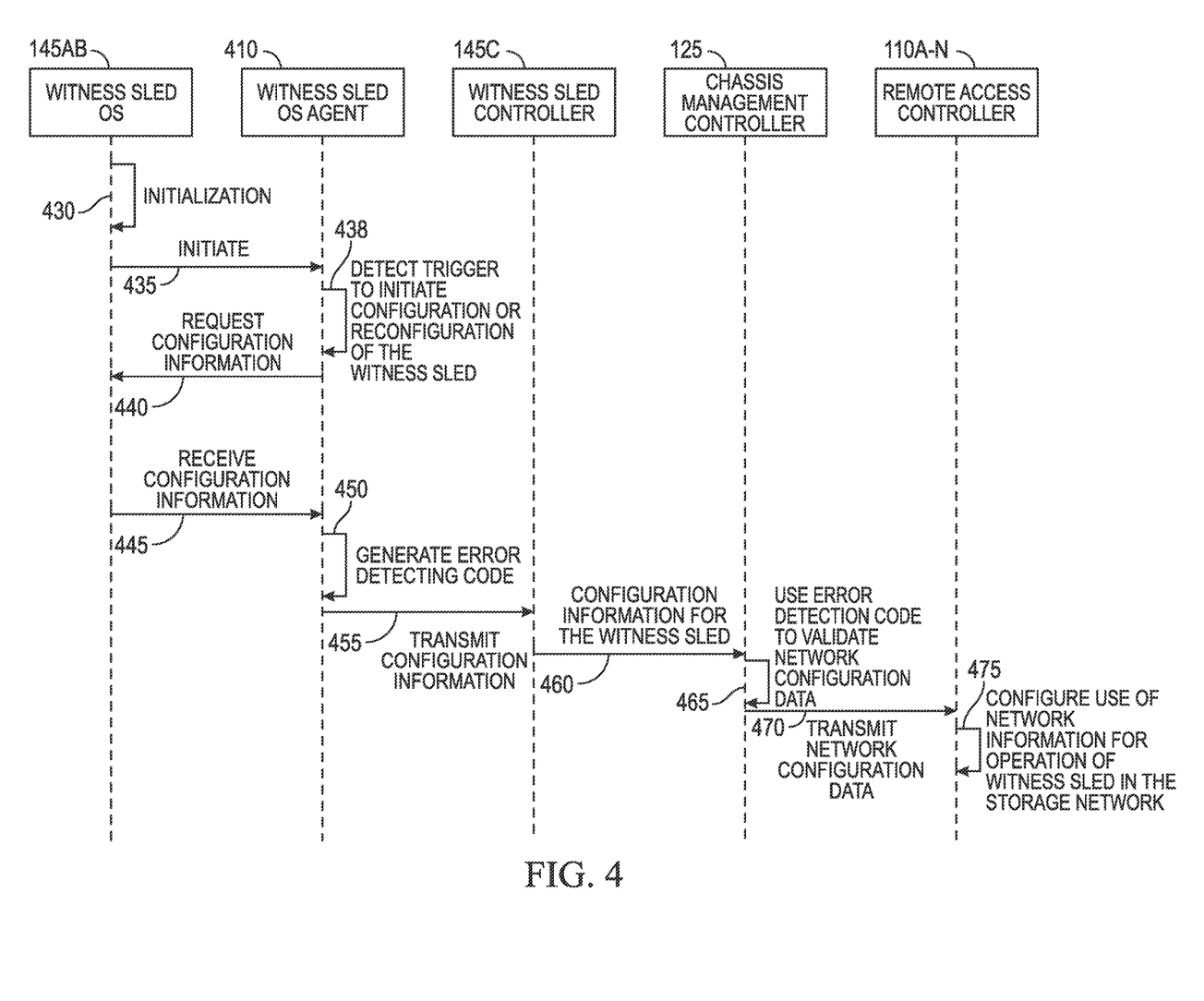
FIG. 4 is a swim lane diagram illustrating certain responsibilities of components of a system, according to some embodiments, for configuration of a witness sled supporting redundant data storage.

FIG. 4 is a swim lane diagram illustrating certain responsibilities of components of a system, according to some embodiments, for configuration of a witness sled supporting redundant data storage. As indicated, some embodiments may begin, 430, with the initialization of the operating system 145ab of the witness sled. As described, the low-power processor of the witness sled 145 may operate a limited-purpose operating system 145ab that is used to implement witness node functions, such as the arbitration of discrepancies that occur in redundantly stored data. Once this limited-purpose operating system 145ab has been initialized, at 435, a configuration agent 410 may be initiated by the operating system.

The configuration agent 410 may be a daemon process of the operating system 145ab and may thus remain in a dormant state until triggered. In some instances, the configuration agent 410 may be automatically triggered, at 438, upon initial booting of the witness sled 145 in order to immediately configure the witness sled for operation in a vSAN or other storage network. Once the witness sled 145 has been configured and is in operation, the configuration agent 410 may be triggered at a later time in response to a re-initialization of the storage network. In some embodiments, the configuration agent 410 may be initiated in response to detecting an error condition that indicates the witness sled 145 is unable to communicate with the storage network and/or to the individual storage devices of the storage network.

Once the configuration agent 410 has been triggered, at 440, the configuration agent queries information for use in configuring the witness sled 145 from the operating system 145ab. For instance, the operating system 145ab of the witness sled may provide an IP address, or other network address, by which network traffic can be directed to the witness sled 145, such as via the described NIC 145e-f capabilities of the witness sled 145. The operating system 145ab may additionally or alternatively provide other configuration information to the configuration agent 410, such as identification of the arbitration procedures that are supported by the operating system 145ab and the witness function APIs that are supported by the witness sled 145.

At 445, this configuration information may be provided to the configuration agent 410 and, at 450, the configuration agent 435 generates an error detection code based on the configuration information. For instance, the configuration agent 435 may generate a cyclical redundancy check (CRC) code from the configuration data and may append the code to the configuration data, such as in metadata. At 455, the configuration agent 435 transmits the configuration data, including the error detection code, to the witness sled controller 145c. As described above, the witness sled controller 145c may operate using firmware instructions that are programmed by a controller, such as MCU (Micro Controller Unit) 125a, of the chassis management controller 125.

Accordingly, in some embodiments, the witness sled controller 145c may be programmed in this manner to receive configuration data from the configuration agent 435 of the witness sled operating system 145ab. In some embodiments, the witness sled controller 145c may be programmed to periodically poll the configuration agent 435 in order to determine whether configuration data is available. As described, such configuration data may be automatically collected by the configuration agent 435 upon its initialization in order to immediately connect the witness sled 145 to a storage network. In other instances, updated configuration data may be available upon any reconfiguration of the witness sled, such as a change in IP address that has been assigned to one or more of the network controllers 145e-f of the witness sled 145. When no configuration data is available by the configuration agent 435, this serves as an indication to the chassis management controller 125 that the witness sled 145 is operating properly, or at least without errors that have triggered any reconfiguration of the witness sled.

Having been programmed to do so by the chassis management controller 125, at 460, the witness sled controller 145c transmits configuration data to the chassis management controller 125. Once the configuration information is received, at 465, the chassis management controller 125 may utilize the code appended to the configuration information to validate the integrity of the received configuration information. As described, the witness sled 145 may be implemented using a low-power processor, such as MCU 125a, that is optimized for witness functions, but is otherwise limited. Accordingly, witness sled 145 may be without robust networking capabilities that can be used to transmit data to the chassis management controller 125 and to validate the integrity of the transmitted data. As such, the chassis management controller 125 utilizes the appended code to ensure that the received configuration data is identical the configuration data received for use by the configuration agent 435. If the appended code indicates that the configuration data has been corrupted, embodiments may signal an error that results, at 438, in a request for updated configuration data to be supplied by the witness sled operate system 145ab.

In scenarios where the received configuration information is successfully validated, at 470, the chassis management controller 125 transmits the configuration information to one or more the remote access controllers 110a-n that are operating in the chassis 100. In some embodiments, some or all of these remote access controllers 110a-n may be operable in configuring a vSAN or other storage network that is operating using the storage resources of the chassis 100. In some embodiments, the chassis management controller 125 may be coupled to each of the compute sleds 105a-n via a coupling that is similar, or identical to, the management signaling pathway 145A between the chassis management controller 125 and the witness sled 145. Accordingly, in such embodiments, the configuration information may be transmitted via a serial coupling, such as an I2C management coupling, between each of the remote access controllers 110a-n of each of the compute sleds 105a-n.

In some embodiments, the chassis management controller 125 may initiate a USB connection via a management coupling with a particular of the remote access controllers 110a-n that is being used, in some instances via remote management tools 101, in order to configure a vSAN that will utilize witness sled 145. In some embodiments, the chassis management controller 125 may utilize various other couplings in interfacing with each of the compute sleds 105a-n, and/or remote access controllers 110a-n. At 470, the configuration information may then be utilized to configure the witness sled 145 for use in a storage network. For instance, provided network address information may be used in initiating a high-speed network connection with the witness sled 145 and provided witness function APIs may be utilized in further configuration of the witness sled for operating in the storage network. In this manner, witness sled 145 may be configured for operation within a vSAN, while accounting for the limited resources of the witness sled.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A chassis comprising:
    a plurality of data storage devices;
    one or more Information Handling Systems (IHSs), each comprising one or more CPUs (Central Processing Units) and further comprising one or more memory devices having instructions stored thereon that, upon execution by a CPU, respectively cause each IHS to store data redundantly to the plurality of data storage devices, wherein the IHSs store data redundantly to the plurality of data storage devices according to instructions of a vSAN application, and wherein the vSAN application reports changes to the redundantly stored data to the witness sled; and
    a witness sled comprising a logic unit and a memory device having instructions stored thereon that, upon execution by the logic unit, cause the witness sled to arbitrate discrepancies in the data redundantly stored in the plurality of storage devices.

2. The chassis of claim 1, wherein the witness sled is replaceable component of the chassis that is removeable by an administrator without opening an enclosure of the chassis.

3. The chassis of claim 2, wherein the one or more IHSs comprise replaceable compute sleds that are removeable by the administrator without opening the enclosure of the chassis.

4. The chassis of claim 1, wherein the vSAN application issues requests to the witness sled for arbitration of discrepancies in the redundantly stored data.

5. The chassis of claim 1, wherein the changes to the redundantly stored data are reported by the vSAN application to the witness sled via a high-speed network connection supported by the witness sled.

6. The chassis of claim 5, wherein the chassis further comprises a chassis management controller comprising a logic unit and a memory device having instructions stored thereon, wherein execution of the instructions causes the logic unit to interface with the witness sled to obtain information for configuring the high-speed network connection supported by the witness sled.

7. The chassis of claim 6, wherein the witness sled comprises a witness controller that is programmed to interface with the chassis management controller to transmit the information for configuring the high-speed network connection supported by the witness sled.

8. The chassis of claim 7, wherein the witness controller is programmed via firmware instructions provided by the chassis management controller.

9. The chassis of claim 7, wherein the witness controller and chassis management controller interface via a serial port connection.

10. The chassis of claim 9, wherein the witness sled appends an error detection code to the configuration information transmitted via the serial port connection to the chassis management controller.

11. The chassis of claim 6, wherein the information for configuring the high-speed network connection supported by the witness sled is transmitted by the chassis management controller to a remote access controller of a respective IHS for use in configuring the witness sled to receive data for use in arbitrating discrepancies in the data redundantly stored in the plurality of storage devices.

12. The chassis of claim 1, wherein the CPUs of the IHSs comprise high-power processors and wherein the logic unit of the witness sled comprises a low-power processor.

13. A witness sled installed within a chassis comprising a plurality of data storage devices, the witness sled comprising:
    a logic unit; and
    a memory device having instructions stored thereon that, upon execution by the logic unit, cause the witness sled to:
        receive information from a chassis management controller of the chassis for configuring the witness sled for operation in a storage network providing redundant storage of data in the plurality of data storage devices;

receive reports of changes to the redundantly stored data;

store information indicating the changes to the redundantly stored data; and based on the stored information, arbitrate discrepancies in the redundantly stored data.

14. The witness sled of claim 13, wherein the redundant storage of data in the plurality of data storage devices is provided via a vSAN application.

15. The witness sled of claim 14, wherein the vSAN application is operated by one or more Information Handling Systems (IHSs) installed in the chassis, wherein each IHS comprises one or more CPUs (Central Processing Units) and further comprises one or more memory devices having instructions stored thereon that, upon execution by a CPU, cause the IHS to operate the vSAN application.

16. The witness sled of claim 13, wherein the chassis management controller configures use of a high-speed network connection supported by the witness sled.

17. An IHS (Information Handling System) installed in a chassis, the IHS comprising:

one or more high-power CPUs (Central Processing Units);

one or more memory devices having instructions stored thereon that, upon execution by a CPU, cause the IHS to:

provide information to a chassis management controller of the chassis for configuring a witness sled of the chassis for operation in a storage network providing redundant storage of data in a plurality of data storage devices;

transmit reports of changes to the redundantly stored data to the witness sled, wherein the reports are transmitted to the witness sled using a high-speed connection configured by the chassis management controller; and issue a request to the witness sled to arbitrate discrepancies in the redundantly stored data.

18. The IHS of claim 17, wherein the redundant storage of data in the plurality of data storage devices is provided via a vSAN application operated by the IHS.

* * * * *